June 3, 1941.  H. PAXTON ET AL  2,243,919
MACHINE FOR THE MANUFACTURE OF BOX PARTS
Filed July 6, 1937  6 Sheets-Sheet 5

INVENTORS:
HALE PAXTON
GERALD C. PAXTON
GLENN E. STILWELL

BY

ATTORNEY

June 3, 1941.   H. PAXTON ET AL   2,243,919
MACHINE FOR THE MANUFACTURE OF BOX PARTS
Filed July 6, 1937   6 Sheets-Sheet 6

INVENTORS:
HALE PAXTON
GERALD C. PAXTON
GLENN E. STILWELL
BY
ATTORNEY

Patented June 3, 1941

2,243,919

UNITED STATES PATENT OFFICE 2,243,919

MACHINE FOR THE MANUFACTURE OF BOX PARTS

Hale Paxton and Gerald C. Paxton, Santa Ana, and Glenn E. Stilwell, Anaheim, Calif., assignors to Food Machinery Corporation, San Jose, Calif., a corporation of Delaware Application July 6, 1937, Serial No. 152,076

5 Claims. (Cl. 144—3)

This invention relates to the box making art and has particular reference to the manufacture of display lug boxes in which each of the lug heads is partially severed by a horizontal slot and the portions on opposite sides of the slot are held together by nails driven into the edge of the head nearest the slot and extending into the head substantial distances beyond the plane of the slot.

Lug boxes of the type above referred to are in common use in the fresh fruit shipping industries and these lugs not only have the ends slotted and nailed, as above mentioned, but have each of the sides of the box put on in two pieces, the parting line between which pieces lies in the same plane as the slots in the box heads. This type of box after being packed with fruit is lidded in the ordinary manner by nailing ends of the lid to the ends of the box and the box thus packed and lidded is shipped to market. After arriving at the market and being delivered to the retailer the box is opened by extending a heavy screw driver or pry bar into the slots in the box heads and prying the portions of the box heads lying above the slots upwardly together with the lid and the upper pieces of the box sides which have been nailed to the parts of the box heads thus pried upwardly. This separation of the box is effected fairly easily and leaves the upper layer of fruit extending a considerable distance above the remaining lower portion of the box so as to make a pleasing display of the fruit in the box.

While the above described type of display lug box has been used fairly widely, the fullest possible use of this box has been prevented by the expense involved in the manufacture of the sawed and nailed box heads.

It is therefore an object of this invention to produce an apparatus for manufacturing heads for display lug boxes of the type described hereinabove whereby these heads may be fairly inexpensively produced.

It is a broad object of our invention to provide a novel machine for manufacturing box parts.

It is a still further object of our invention to provide a novel apparatus for handling box parts.

It is yet another object of our invention to provide a machine which is adapted to stack box parts in a series of stacks of predetermined size.

The manner of accomplishing the foregoing object, as well as further objects and advantages, will be made apparent in the following description taken in connection with the accompanying drawings.

Referring specifically to the drawings, the preferred embodiment of the apparatus of our invention illustrated therein comprises a combination saw and nailing machine 20. This machine includes a frame 21, a box head runway and magazine means 22, a stack storage conveyor 23, a power mechanism 24, a feed mechanism 25, a nailing mechanism 26, a saw mechanism 27 and a stacking mechanism 28.

The frame 21

The frame 21 preferably includes four legs 35, two of which carry fixed axle wheels 36, and two of which carry casters 37. The legs 35 are united at their upper ends by a rectangular angle iron head frame 38 and at their lower ends by a base frame 39. Mounted on top of head frame 38 is a top plate 40. This top plate is provided with openings 41, 42, 43, 44, 45 and 46. The frame 21 also has vertical members 50 and 51 which carry bearings 52 and 53 respectively, there being an opening 54 in member 51 the purpose of which will be made clear hereinafter.

Box head runway and magazine means 22

Figure 3:
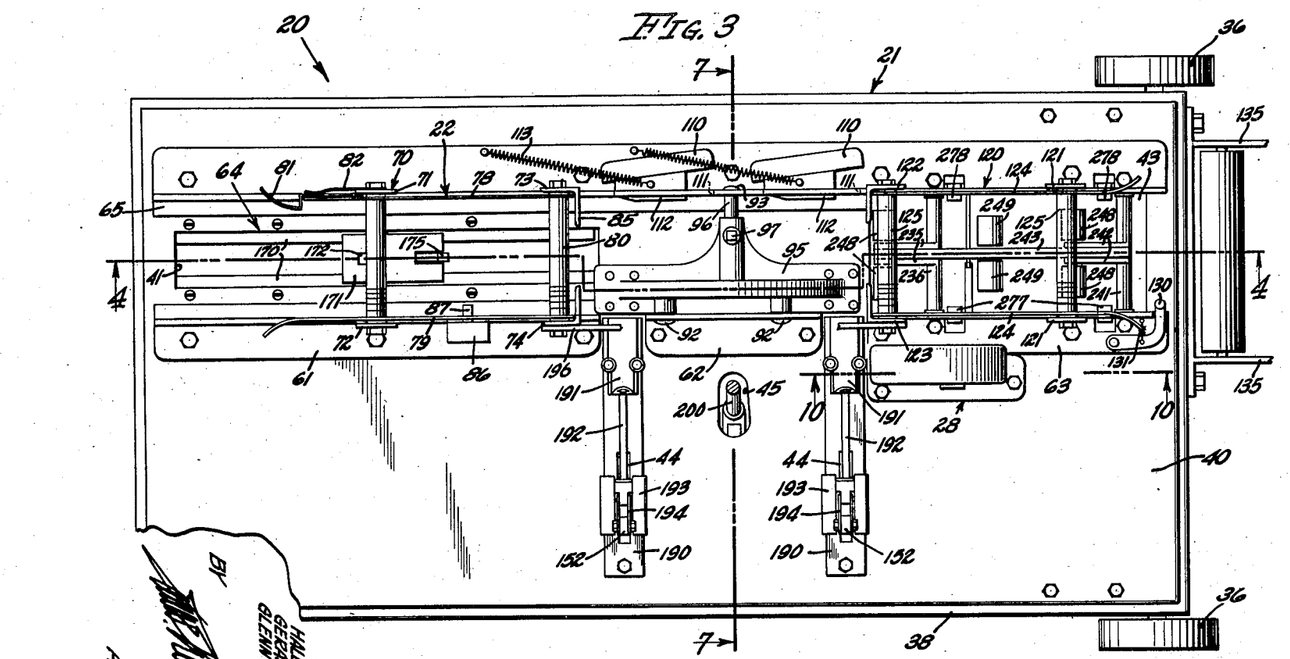
Fig. 3 is a plan view of the machine shown in Fig. 1.

Rigidly secured to the upper face of the top plate 40 is an angle iron member 60 (which runs practically the full length of the top plate) and angle iron members 61, 62 and 63 which are disposed in alignment with each other and uniformly spaced from the angle iron 60 to cooperate therewith to form a box head guide runway 64. Mounted on the table top 40 just within the angle iron members 60, 61 and 62 and terminating at the plate opening 43 are box head supporting rails 65. Mounted on the angle irons 60 and 61 is a box head feed magazine 70 which includes upright flat bars 71 and 72 and upright angle iron bars 73 and 74, these bars all being secured at their lower ends to the angle iron members 60 and 61. Mounted on these upright bars are magazine walls 78 and 79, the upper ends of these walls being spaced by spacers 80. The wall 79 at the left hand or open end of the magazine 70 is flared, as indicated in Fig. 3, and the corresponding end of the wall 78 is provided with a flared latchgate 81 which is yieldably biased inwardly into box head trapping position by a leaf spring 82 mounted on the upright bar 71. As clearly shown in Figs. 4 and 6 the inwardly extending flanges 85 of the angle iron bars 73 and 74 extend into the path of the box heads in the magazine 70 to prevent the feeding of any of these heads from the magazine 70 except that disposed in lowermost position and resting directly on the rails 65.

Figures 4, 5:
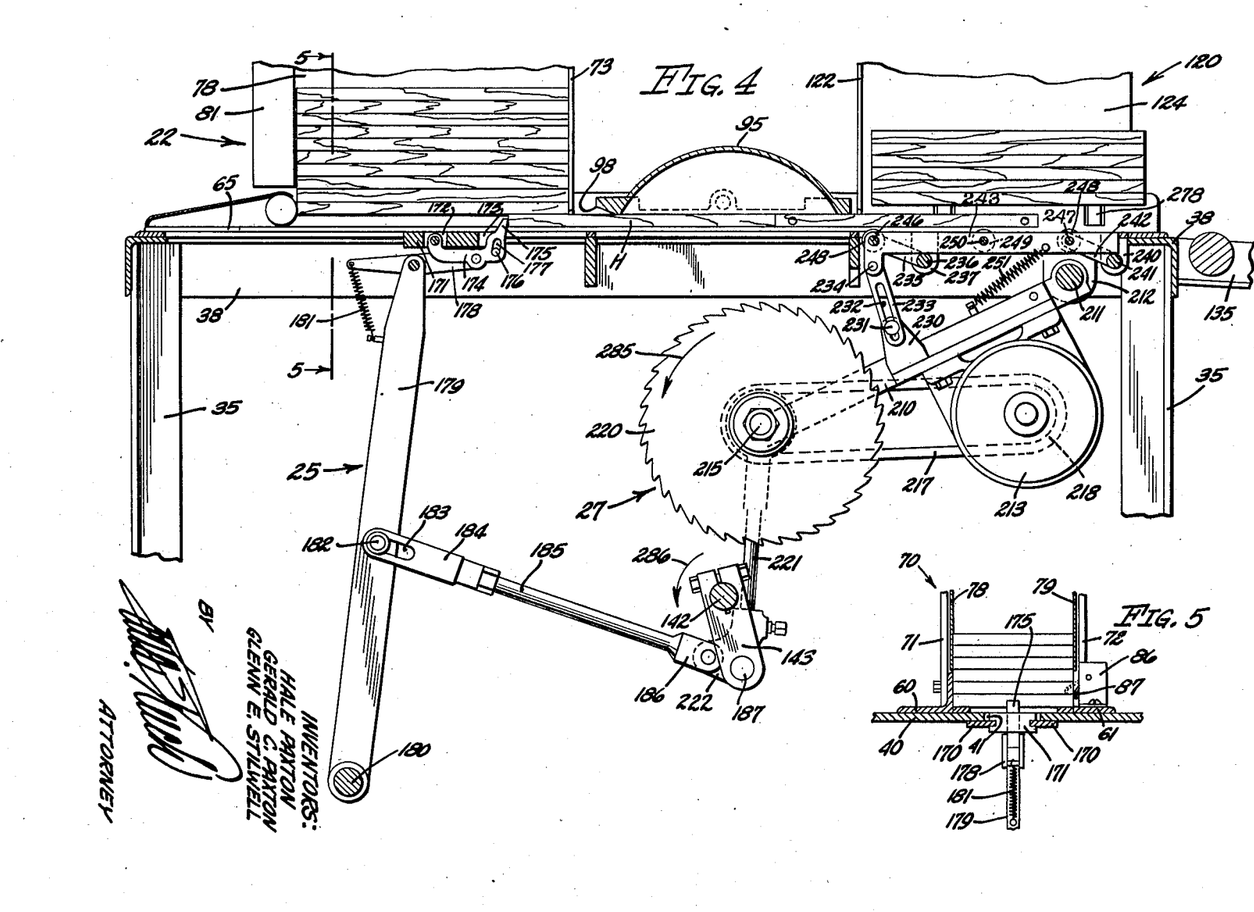
Fig. 4 is a longitudinal vertical sectional view taken on the line 4—4 of Fig. 3 and shows a blank box head being fed into processing position and the circular saw means of the invention starting to rise so as to engage and slot this blank.
Fig. 5 is a fragmentary cross sectional view taken on the line 5—5 of Fig. 4.

Mounted on the angle iron 61 is a limit switch 86 having a finger 87 which is yieldably pressed inwardly into the magazine 70 into the position in which it is shown in Fig. 3, in a manner well known in the art, and when so positioned the circuit of the switch 86 is open. The switch 86 is so made, however, that when box heads are placed in the magazine 70, as shown in Fig. 5, so that two or more heads are disposed at the bottom of the magazine, the finger 87 is held outwardly by these heads thus maintaining the circuit of the switch 86 closed.

Figures 1, 2:
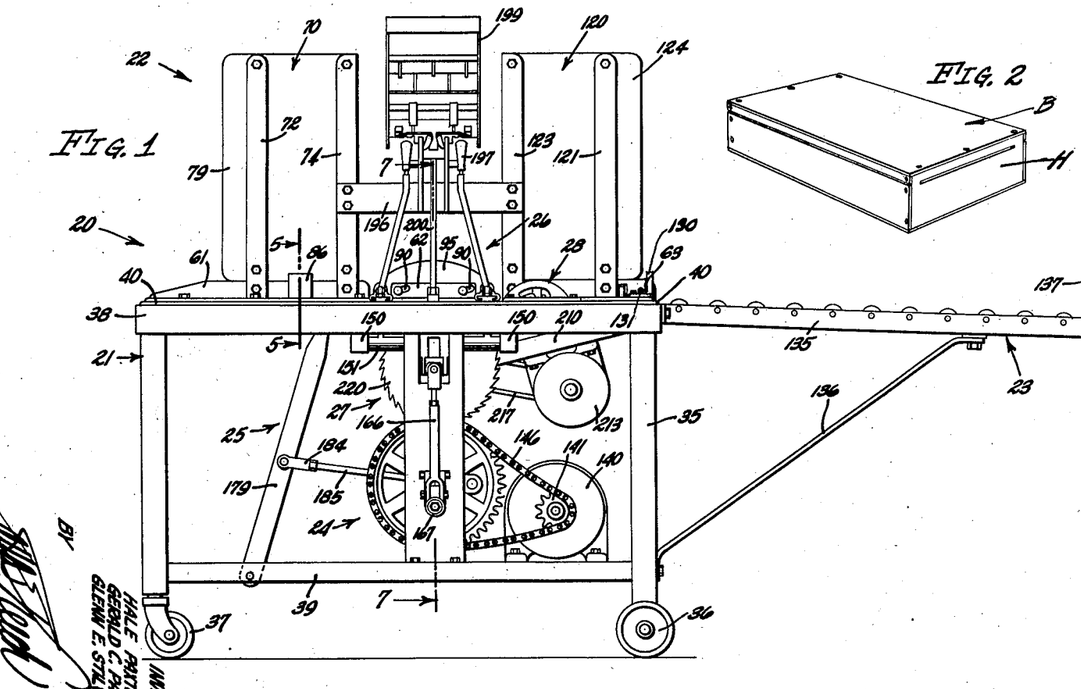
Fig. 1 is a front elevational view of a preferred embodiment of the apparatus of our invention.
Fig. 2 is a perspective view of a display lug box the heads of which it is the object of this invention to manufacture.
Figure 7:
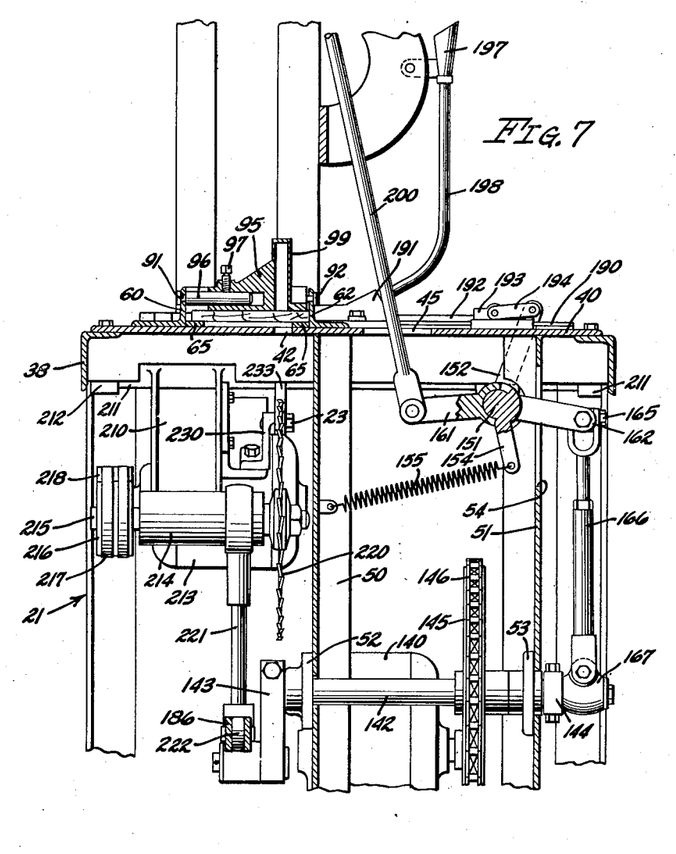
Fig. 7 is a fragmentary enlarged transverse sectional view taken on line 7—7 of Fig. 3.
Figure 8:
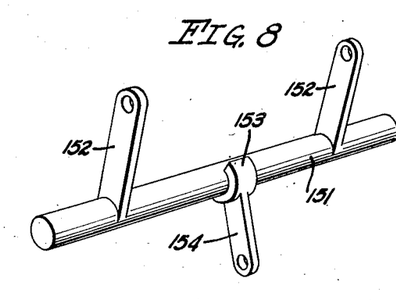
Fig. 8 is a perspective view of the nailing mechanism operating shaft of our invention.
Figure 9:
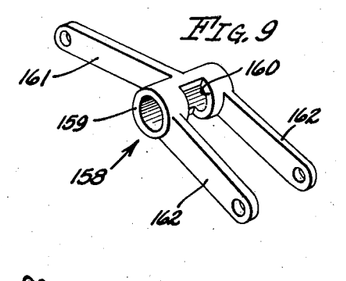
Fig. 9 is a perspective view of a nailing mechanism operating lever which, while shown separate from the shaft illustrated in Fig. 8, is normally assembled permanently on said shaft.
Figure 10:
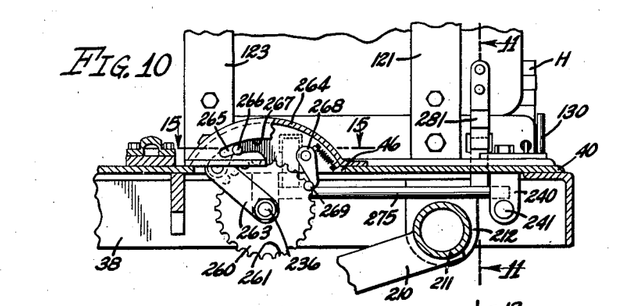
Fig. 10 is an enlarged fragmentary sectional view taken on line 10—10 of Fig. 3 and illustrating the mechanism for controlling the discharge of a stack of finished box heads from the apparatus.

That portion of the runway 64 which is disposed in the middle of the machine is where the box heads are positioned in what may be referred to as a "processing position" as it is in this position in which each box head is processed in the machine. As shown in Figs. 1, 3 and 7 the angle iron 62 is provided with sloping slots 90 and the angle iron 60 is provided with a sloping slot 91, these slots all sloping downwardly towards magazine 70 and at the same angle. Mounted in the slots 90 and 91 by pins 92 and 93 is a saw guard and head gripping member 95, the pin 93 being secured to the member 95 by a bar 96 which is slidable in a suitable opening provided in the member 95 and adjustably secured thereto by a set screw 97. As indicated in Fig. 4 the left hand end of the member 95 is provided with an upwardly inclined guide face 98, the purpose of which will be made clear hereinafter. As shown in Figs. 3 and 7 the member 95 has a saw guard 99 provided thereon which is disposed directly over and in alignment with the opening 42 in the frame top plate 40.

At points opposite the processing position in the center of the machine previously referred to, the angle iron 60 is provided with guide bars 110 which are preferably welded to this angle iron member, the latter also having slots 111 formed in its upright flange opposite these bars. Disposed to slide against bars 110 and extend through the slots 111 so as to overlie the adjacent runway rail 65 is a pair of nailing anvils 112 which are yieldably held in engagement with the left ends of the slots 111 by coil springs 113. The inner edges of the anvils 112 are for the most part flat and parallel with the rails 65 but their leftwardmost portions are beveled as shown in Fig. 3.

Mounted on the right hand end of the angle iron 60 and on the angle iron 63 is a stacker magazine 120 which is disposed directly over the opening 43 in the frame top plate 40 and includes upright flat bars 121 and upright angle iron bars 122 and 123 upon which magazine walls 124 are supported.

The walls and the upper ends of the bars 121, 122 and 123 are rigidly spaced by spacers 125.

Pivotally mounted on a vertical axis on the angle iron 63 is a stack stop 130 which is yieldably held by spring 131 into a position as shown in Fig. 3 in front of a stack of heads disposed in the magazine 120.

The stack storage conveyor 23

This conveyor is preferably of the ordinary gravity type and includes an inclined gravity conveyor section 135 which is secured to the right hand end of the head frame 38 and is braced from beneath by a brace 136 connected to the base frame 39. At the end of the conveyor 135 is a stop 137.

The power mechanism 24

This mechanism includes an electric drive motor 140 mounted on the base frame 39 said motor preferably having incorporated therewith a reduction gearing on which is provided a pinion sprocket 141.

Journalled in the bearings 52 and 53 is a crank shaft 142 having a crank 143 on its rear end and a crank 144 on its front end, and which has fixed thereon in alignment with pinion 141 a master sprocket 145, the latter being connected to said pinion by a chain 146.

Journalled at its ends in bearings 150 provided on the frame 21 is a nailing mechanism operating shaft 151 having two arms 152 which extend upwardly therefrom through the openings 44 in the top plate 40 (see Fig. 3). Secured centrally to the shaft 151 is an arcuate hub 153 of an arm 154 which extends downwardly therefrom and is connected by a spring 155 to the frame member 50 so as to constantly urge the shaft 151 to rotate in a clockwise direction, as seen in Fig. 7.

Rockably assembled on the shaft 151, as shown in Fig. 7, is a nailing mechanism operating lever 158 which has a hub 159 provided with a slot 160 and having fixed thereto a nail hopper operating arm 161 and a pair of drive arms 162.

The operating lever 158 is assembled with shaft 151 during the manufacture of the latter so as to be permanently united therewith with the hub 153 of arm 154 disposed in the slot 160. When thus disposed the hub 153 has a degree of lost motion rotatively in the slot 160 for a purpose to be made clear hereinafter.

Disposed between and pivotally connected to extremities of the arms 162 is a universal joint 165 of a pitman 166, the lower end of the latter being connected by a swivel bearing 167 to the crank 144.

Box head feed mechanism 25

Secured to the bottom of the frame top plate 40 on opposite sides of the opening 41 therein is a pair of guide bars 170 which, as shown in Figs. 3 and 5, slidably support a feed slide block 171. The block 171 has openings 172 and 173, in the first of which is pivotally mounted the rear end of an arm 174 having a feed dog 175 at its front end which extends up into opening 173. The arm 174 has a limited degree of movement relative to the slide block 171, by virtue of a pin 176 on this block extending into a slot 177 on this arm. The arm 174 is pivotally connected by links 178 to the upper end of a power lever 179 the lower end of which is pivotally mounted on a shaft 180 provided on the base frame 39 of the machine. The links 178 extend leftward beyond their pivotal connection with the lever 179 and are connected by a contractile spring 181 to the lever 179 to continually urge the arm 174 into its upwardmost position in which the dog 175 extends above the upper surface of the box head guide rails 65.

The lever 179 has a pin 182 which extends through a slot 183 in a bifurcated head 184 of a pitman 185 having a lower forked end 186 which is connected to the crank pin 187 of the crank 143, as shown in Figs. 4 and 7 (and as will be presently described) so that as this crank 143 rotates the lever 179 is swung back and forth causing a reciprocation of the sliding head 171 from one end of the magazine 70 to the other for the purpose of feeding box heads from the lower end of this magazine.

The nailing mechanism 26

Secured as by suitable bolts to the upper face of the top plate 40, as shown in Figs. 1, 3 and 7, are a pair of driver guide plates 190 which have apertures corresponding and in alignment with openings 44 of the plate 40 and up through which the arms 152 of the shaft 151 also extend. Mounted on the inner ends of the plates 190 are a pair of nail chucks 191 having drivers 192. The outer ends of the drivers 192 are fixed to slide blocks 193 which are slidable on the plates 190 and are connected by links 194 to the upper ends of the arms 152 so that as the shaft 151 is rocked to swing the arms 152 inwardly the drivers 192 are slid inwards into the nail chucks 191 to drive nails therefrom.

Attached to the magazine upright bars 74 and 123 is a nail hopper supporting frame 196 having funnels 197 and tubes 198 for directing nails therefrom to nail chucks 191. Pivotally mounted on the hopper frame 196 is a suitable nail hopper 199 which is adapted to be rocked by a pitman 200 the upper end of which pivotally connects to the hopper 199 and the lower end of which pivotally connects with the arm 161 as shown in Fig. 7, this pitman extending through the opening 45 in the frame top plate 40. When so rocked, the nail hopper 199 delivers with each cycle of its motion a single nail to each of the funnels 197 which nails gravitate immediately through the tubes 198 into the nail chucks 191.

Saw mechanism 27

Figure 6:
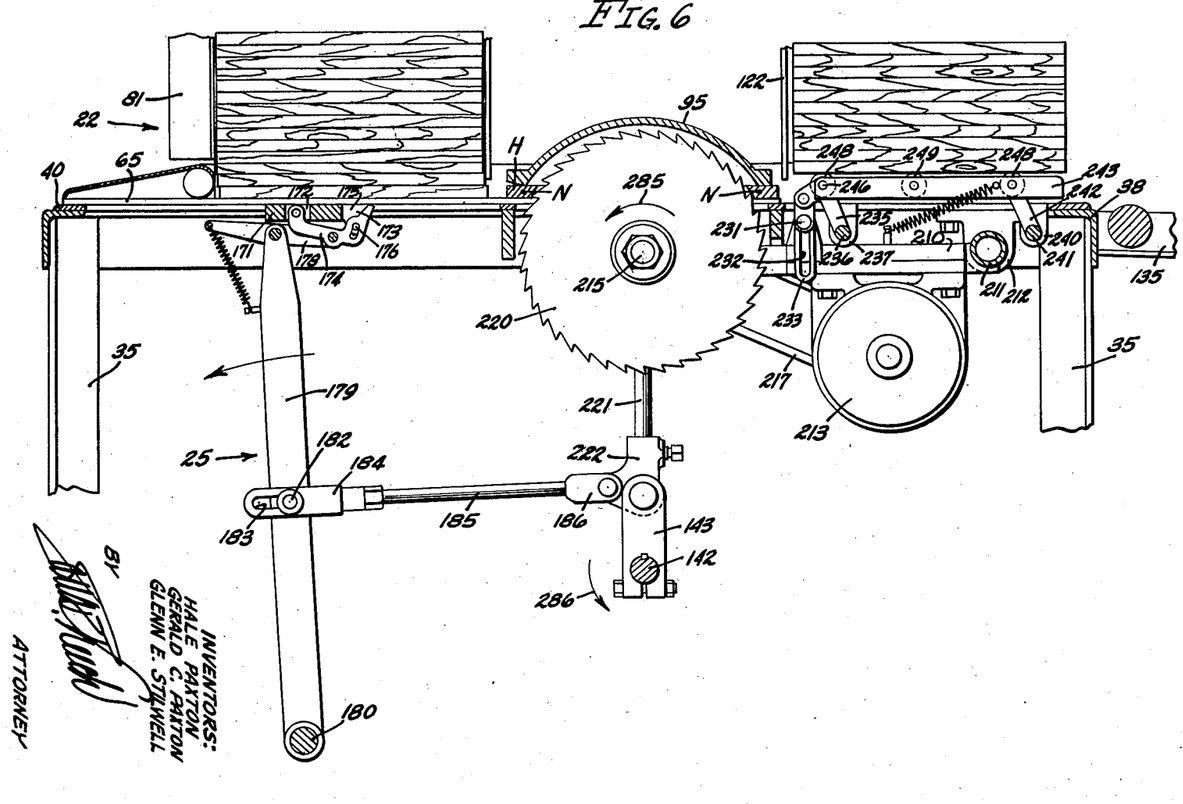
Fig. 6 is a view similar to Fig. 4 and showing the feeding mechanism in the midst of a reverse stroke and the circular saw mechanism disposed in its uppermost slotting position.

This mechanism has a rockable base 210 which is mounted on a shaft 211, the opposite ends of which are journalled in suitable bearings 212 provided on the frame 21. The base 210 supports an electric motor 213 and has a bearing 214 in which is journaled a saw shaft 215 having a pulley 216 which is directly connected by V-belts 217 to a pulley 218 mounted on the shaft of the motor 213. To the opposite end of the shaft 215 is fixed a circular saw 220 which lies in the vertical plane of the longitudinal axis of the opening 42 in the top plate 40 and the corresponding opening provided in the saw guard 99 (see Fig. 7). The end of the bearing 214 adjacent the saw 220 provides an outer bearing surface which pivotally receives the upper end of a pitman 221, the lower end of which pivotally connects with crank 143 and is provided with a bearing ear 222 to which the bifurcated end 186 of the pitman 185 pivotally connects. It is thus seen that rotation of the shaft 142 reciprocates the saw 220 up and down between its lower position as substantially shown in Fig. 4 and its uppermost position as shown in Fig. 6.

The stacking mechanism 28

Provided on the saw mechanism base 210 is a lug 230 having a bolt 231 which is disposed in a slot 232 formed in a link 233. The upper end of the link 233 is pivoted at 234 to a pair of arms 235 on a shaft 236, the opposite ends of the latter journalling in bearings 237 provided on the frame. Disposed parallel with the shaft 236 and having its opposite ends journalled in bearings 240 provided on the frame is a similar shaft 241 having a pair of arms 242. Resting in its lowermost position on the shafts 236 and 241 and disposed on the longitudinal axis of the stacking magazine 120 is a stacking bar 243 to which the extremities of the arms 235 and 242 are pivotally connected by shafts 246 and 247. Mounted on opposite ends of the shafts 246 and 247 are stacking rollers 248. Another pair of similar rollers 249 are pivotally mounted in the same plane on a shaft 250 which is provided on the bar 243 in between the shafts 246 and 247.

Connected at its opposite ends to the saw mechanism base 210 and to the bar 243 is a contractile spring 251 which tends to yieldably maintain this bar in its lowermost position resting on the shafts 246 and 241.

Figure 11:
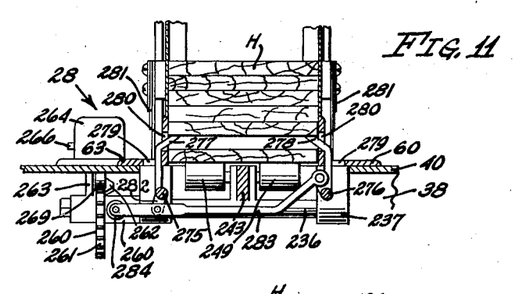
Fig. 11 is a fragmentary cross sectional view taken on line 11—11 of Fig. 10 and showing the finished box head supporting dogs positioned as when adapted to receive the individual heads into the finished head stacking magazine.
Figure 12:
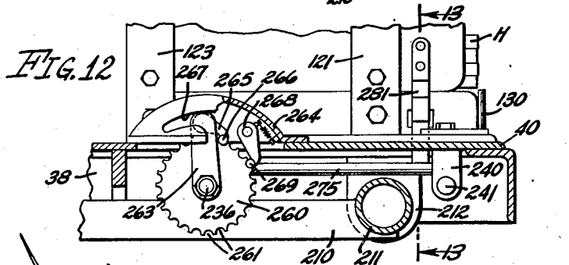
Fig. 12 is a view similar to Fig. 10 and illustrates the step by step operation of the stack discharge control mechanism of the invention.
Figure 13:
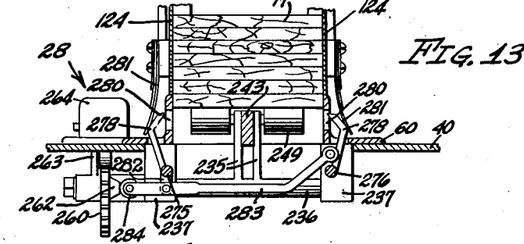
Fig. 13 is a view taken on the line 13—13 of Fig. 12 and illustrates the swinging of the finished head supporting dogs into their outwardmost positions while a stack of heads is supported on the rollers lifting the lowermost head into place.
Figure 14:
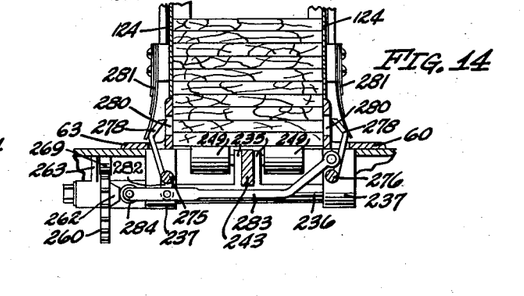
Fig. 14 is a view similar to Fig. 13 and illustrates the lowering of the stack of heads just referred to into downward position in which this stack is adapted to be ejected from the machine.
Figure 15:
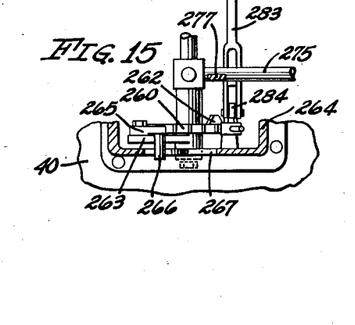
Fig. 15 is fragmentary diagrammatic horizontal sectional view taken on the line 15—15 in Fig. 10.

Referring now to Figs. 10 to 15, inclusive, it is to be noted that shaft 236 extends forwardly through the forwardmost bearing 237, where it carries freely rotatable thereon a ratchet gear 260 having a series of semi-circular recesses 261 formed in its periphery. Gear 260 has a cam lug 262 provided on its rear face, as shown in Figs. 11, 13 and 14.

Fixed upon the forward extremity of the shaft 236 is an arm 263 which, with the gear 260 extends upwardly through opening 46 in the top plate 40 and into a hood 264 mounted on the top plate over this opening.

Provided on the upper end of the arm 263 is a dog 265 carrying a pin 266 which extends out through an opening 267 in the side of the hood 264, the lower surface of this opening being shaped to permit the pin 266 to drop downwardly into one of the recesses 261 in the periphery of the gear wheel 260 and rotate this wheel a given distance when the arm 263 rocks with the shaft 236.

Pivotally mounted on the hood 264 and spring-biased downwardly is a detent dog 268 having a pin 269 which tends to rest at all times in one of the recesses 261, excepting when the ratchet gear 260 is being rotated by the pin 266.

Journalled at their ends in suitable bearing holes provided in the bearing blocks 237 and 240 are a pair of shafts 275 and 276, these having latch fingers 277 and 278, respectively, which extend upwardly from these shafts through suitable openings 279 in the angle irons 60 and 63 and inwardly through openings 280 in said angle irons, as shown in Fig. 11.

Provided on the magazine walls 124 and bearing against an opposite pair of the fingers 277 and 278 are leaf springs 281 for yieldably holding the fingers 277 and 278 in their inwardmost positions.

Shaft 275 has a short arm 282 extending downwardly therefrom adjacent the shaft 236, and a link 283 which is also adjacent the shaft 236 pivotally connects to arm 282 and to the finger 278 in alignment therewith as shown in Fig. 11. The forward end of the link 283 extends to a point close to the rear face of the ratchet gear wheel 261 and is there provided with a roller 284 which lies in the path of the cam lug 262 provided on this ratchet gear. When the ratchet gear 261 is rotated as by engagement of the pin 266 therewith, so as to bring the lug 262 into engagement with the roller 284, this results in the link 283 being swung rearwardly thus rocking the shafts 275 and 276 and swinging the fingers 277 and 278 outwardly from within the magazine 120, as shown in Fig. 13.

Operation

The operation of the combination saw and nailing machine 20 in performing the method of our invention is as follows:

The magazine 70 is first furnished with a supply of blank box heads H so as to substantially fill this magazine, the lowermost heads in the magazine engaging the finger 87 of the switch 86, as shown in Fig. 5, to close this switch. As this switch is included in the wiring circuits of the motors 140 and 213, these motors may now be energized by turning on the switch controlling the supply of electricity thereto. When this takes place the saw wheel 220, of course is set in motion and rapidly rotated in the direction of the arrow 285 (see Figs. 4 and 6). At the same time the shaft 142 is being rotated by the motor 140 in the direction of the arrow 286.

With the first rotation of the shaft 142 the feed dog 175 is caused to engage the lowermost blank box head H in the magazine 70 to feed this along the runway 64 into processing position. In this movement the head H engages the cam face 98 of the member 95, thereby shifting the latter slightly to the right, the slots 90 and 91 thereby causing this member to be raised slightly to admit this head H therebeneath. At the same time the movement of the head H along the runway 64 brings the rear edge of this head into engagement with the nailing anvils 112, so as to shift these slightly to the right, thereby making room for this head to move past them, though in close sliding contact with these anvils.

As the feeding movement of this head H into processing position is thus completed, the crank 143 swings upwardly the whirling circular saw 220 which, owing to the direction of its rotation tends to return this head H from the position in which it is first contacted back towards the magazine 70 from which it came. Owing to the inclination of the slots 90 and 91, however, this tendency results in the member 95 binding said head H downwardly against the rail 65 on which the head is resting. At the same time this occurs the tendency of this head H to return towards the magazine 70 under the impulse of the saw 220 causes a frictional engagement of this head with the nailing anvils 112 thereby causing the latter to bind the head against the angle iron 62 and prevent any motion of the head in response to the rotating saw 220. Each head H when it is fed into processing position and immediately thereafter engaged by the rising and rotating saw 220 is thus rigidly locked against returning towards the magazine 70 from which it came.

As the shaft 142 continues to rotate, the crank 144 shifts the pitman 166 upwardly and rocks the lever 158 about the shaft 151 until the lower edge of the slot 160 in the hub 159 of this lever engages the fractional hub 153 of the arm 154 on the shaft 151 which results in a swinging motion of arms 152 being thenceforth transmitted directly to the shaft 151 and the arms 152 extending upwardly therefrom. Thus the arms 152 are swung inwardly and with these arms the nail drivers 192 which are fastened thereto through the blocks 193 and links 194. Nails previously fed to the nail chucks 191 from the hopper 199 are thus automatically driven from the chucks into the edge of the box head H now located in processing position. The nail chucks 191 and associated mechanism are so located with reference to the work when thus positioned that these nails are driven into the box head H very close to the ends of the slot cut in the head by the saw 220 as indicated in Fig. 6 where the nails are designated by the letter N.

The rocking of lever 158 with each cycle of operations actuates the nail hopper 199 to feed another pair of nails to the nail chucks 191. One of the reasons for the lost motion between the lever 158 and the shaft 151 is to accomplish the long stroke needed to work the nail hopper by the same pitman which operates the nail drivers.

Following the processing of a given box head H in the manner above described the saw 220 returns downwardly with the downward swinging of the crank 143 and another cycle of operations is commenced by the feeding of a fresh blank into processing position by another rightward movement of the dog 175. As the new blank is thus fed from the magazine 70 into processing position it expels from this position the blank head just processed and the completion of the feeding of the second blank leaves the first one disposed within the stacking magazine 120. Rightward movement of this finished head is halted by its engaging the spring stop 130, the finished head now resting upon rollers 248 and 249 with the latter in their lower position, as shown in Fig. 4. As the saw mechanism 27 is swung upward from the position in which it is shown in Fig. 4, to slot the second blank, the bolt 231 travels along the slot 232 of the link 233 and, having reached the upper end of this slot, starts to lift on the arms 235. This results in rocking the shafts 236 and 241 and lifting upwardly the rollers 248 and 249 and the finished head supported thereon. As the rollers 248 and 249 rise, they lift the box head resting thereon against the fingers 277—278 and cam said fingers apart permitting this box head to rise above the normal position of these fingers, whereupon the springs 281 shift said fingers back into the positions in which they are shown in Fig. 11. As the saw mechanism 27 descends at the conclusion of the processing of the second blank hereinabove discussed, gravity, assisted by the spring 251 will pull the bar 243 downward until it rests upon the shafts 236 and 241 thereby rocking the latter and returning the arms 235 and rollers 248 and 249 back into their lowermost positions in which they are shown in Fig. 4.

The first box head is now left resting on the upper ends of fingers 277 and 278 as shown in Fig. 11. As the operation of the machine 20 is continued and the successive box heads H are processed, fed into the stocking magazine, and lifted upwardly by the stacker mechanism 28, these heads accumulate above the fingers 277 and 278 to form a stack.

When the machine 20 is started the ratchet wheel 261 is preferably adjusted so that the cam lug 262 is disposed just beneath the roller 284. The arm 263 is so fixed on the end of the shaft 236 that with each cycle of operation of the machine the pin 266 engages one of the recesses 261 in the ratchet gear 260 and rotates this gear exactly the space between adjacent recesses 261. As there are twenty-five recesses 261 about the periphery of the gear 260 it is thus seen that a stack of twenty-five heads H will have been processed and accumulated in the stacker magazine 120 before the gear 260 will have rotated sufficiently to bring the cam lug 262 to the position in which it is shown in Figs. 13 and 14 where it will engage the roller 284 and shift the fingers 277 and 278 outwardly. As this happens at a time when the rollers 248 and 249 are disposed upwardly so as to support the stack on the rollers, the return downward of these rollers as the saw mechanism is lowered does not leave the stack resting on the fingers 277 and 278 as was previously the case but allows the stack to be carried downwardly on these rollers so that the lowermost box head in the stack is directly in line with the head just processed and which is about to be ejected into the stacker magazine. Being thus in the path of the incoming manufactured head, the stack is thus expelled from the stacking magazine by said head as the latter moves into the stacking magazine the spring stop 130 yielding to permit the stack to pass. When thus expelled the stack travels along the idle roller conveyor section 135 of the stack accumulating conveyor 23 and comes to rest against the end stop 137.

From the foregoing description it is seen that after the machine 20 is once started the only thing that is necessary to do in order for the processing operation of the machine 20 to continue indefinitely without halting is to keep the nail hopper 199 supplied with nails, to keep the feed magazine 70 supplied with blank box heads, and to keep the accumulating conveyor 23 from becoming congested with stacks of processed heads. It is to be noted, however, that in the event that a supply of blank box heads is not maintained in the feed magazine 70, the finger 87 of the switch 86 will be automatically released and permitted to spring upwardly thereby breaking the circuit of the switch and shutting off the motors 140 and 213.

As the switch 86 is included in the circuit of motors 140 and 213, these motors will again be started when a new supply of blank box heads is delivered into said magazine 70. Thus, the machine 20 is automatically stopped each time the supply of blank box heads therein is exhausted, remains stopped as long as this condition continues, and starts again to process box heads as soon as a fresh supply of the latter is delivered to the magazine 70.

What we claim is:

1. In combination: means to feed a series of shook blanks along a given path by intermittent movements separated by pauses, one of said blanks halting during each of said pauses in a processing position; means for locking each blank against reverse movement along said path when said blank is in said processing position; circular saw means operated in timely relation with said feed means to move into engagement with each blank as it arrives in said processing position to cut a slot in said blank, said circular saw means having cutting engagement with said blank in a direction reverse to that in which said feed means feeds said blanks to cut a slot in each blank; nailing means for driving nails into an edge of each of said blanks adjacent the ends of the slots when said blank is in said processing position, and means for coordinately actuating said feed means, said circular saw means and said nailing means.

2. In combination: means for feeding box material along a given path in a given direction allowing said material to halt in a processing position; a circular saw; means for rapidly rotating said saw; means for shifting said saw against said material when the latter is in processing condition to cause said saw to cut a slot in said material and exert a force on said material urging the latter in the same direction in which the teeth of said saw move in engaging said material; binding means disposed for operation on said material when the latter is in processing position, said binding means having gripping faces arranged for engagement with opposite faces of said material adjacent an edge thereof and being responsive to movement of said material under the rotative urge of the saw to rigidly grip said material against movement in said direction with said saw; nail driving means disposed adjacent said processing position for driving nails in edges of said material between said gripping faces; and means for actuating said nail driving means during gripping engagement of said material by said binding means.

3. In a machine for manufacturing display box ends, the combination of: means for gripping a box end in a given position; means disposed adjacent said position for operating on said box end to form a slot therein which extends through said box end but is spaced from side edges thereof to leave unsawed portions of said box end in the plane of said slot and at opposite ends thereof; nail driving means disposed adjacent said position for driving nails into said box end to cause said nails to pass through the plane of said slot; and means for co-ordinately actuating said slot forming and nail driving means in timed relation to form said slot and drive said nails into a box end held in said position by said gripping means.

4. In a machine for manufacturing display box ends, the combination of: means for feeding a series of shook blanks along a given path by intermittent movements separated by pauses, one of said blanks halting during each of said pauses in a processing position; means for locking each blank against movement in a given direction along said path when said blank is in said processing position; circular saw means adapted to move into engagement with each blank as it arrives in said processing position to cut a slot in said blank which extends through said blank but is spaced from side edges of the latter to leave unsawed portions of said blank in the plane of said slot and at opposite ends thereof, said circular saw means having cutting engagement with said blank in a direction against which said locking means locks said blank against movement; nailing means disposed adjacent said processing position and adapted for driving nails into each of said blanks adjacent the ends of the aforesaid slots and through the plane thereof while said blank is in said processing position; and means for co-ordinately actuating said feed means, said circular saw means, and said nailing means in timed relation so as to feed said blanks as aforesaid and to slot and nail each of said blanks while the latter is in said processing position.

5. In a machine for manufacturing display box ends, the combination of: means for feeding a series of shook blanks along a given path by intermittent movements separated by pauses, one of said blanks halting during each of said pauses in a processing position; means for locking each blank against movement in a given direction along said path when said blank is in said processing position; circular saw means adapted to move into engagement with each blank as it arrives in said processing position to cut a slot in said blank which extends through said blank but is spaced from side edges of said blank to leave unsawed portions of said blank in the plane of said slot and at opposite ends thereof, said circular saw means having cutting engagement with said blank in the direction against which said locking means locks said blank against movement; nailing means for driving nails into an edge of each of said blanks adjacent the end of the aforesaid slot in said blank during one of said pauses; and means for co-ordinately actuating said feed means, said circular saw means, and said nailing means in timed relation.

HALE PAXTON.
GERALD C. PAXTON.
GLENN E. STILWELL.

CERTIFICATE OF CORRECTION.

Patent No. 2,243,919.     June 3, 1941.

HALE PAXTON, ET AL.

It is hereby certified that error appears in the printed specification of the above numbered patent requiring correction as follows: Page 5, second column, line 40, claim 2, for the word "condition" read --position--; page 6, first column, line 15, claim 4, for "a" read --the--; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.